Jan. 28, 1964     H. M. AUSTENSON     3,119,585
CHRISTMAS TREE SUPPORT
Filed Aug. 8, 1960     2 Sheets—Sheet 1
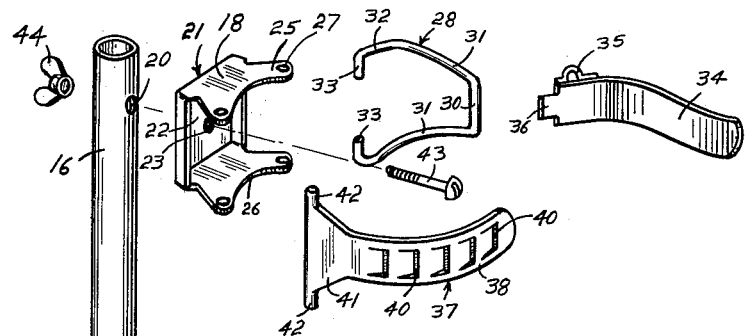
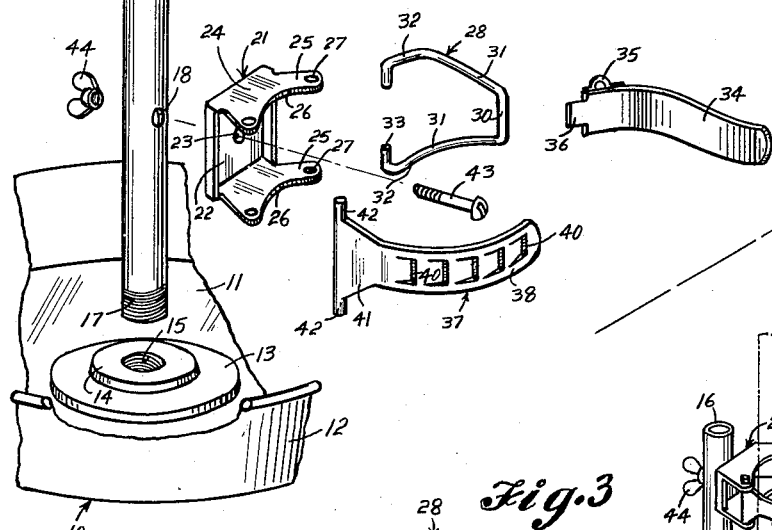
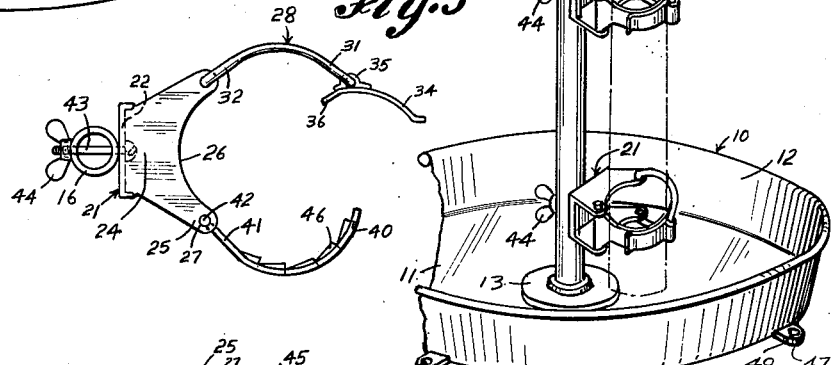
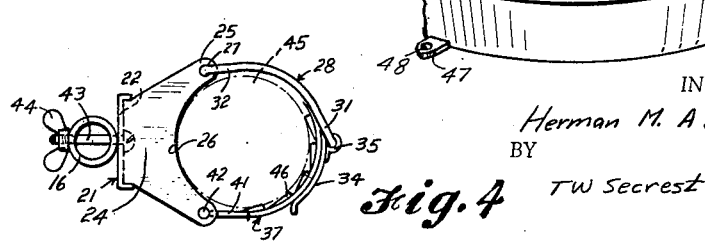
INVENTOR.
Herman M. Austenson
BY
TW Secrest INVENTOR.
Herman M. Austenson
BY TW Secrest

United States Patent Office 3,119,585
Patented Jan. 28, 1964

3,119,585
CHRISTMAS TREE SUPPORT
Herman M. Austenson, Rte. 1, Box 423, Sumner, Wash.
Filed Aug. 8, 1960, Ser. No. 48,191
2 Claims. (Cl. 248—44)

This invention relates to a Christmas tree support and which support has sufficient stability to maintain a Christmas tree in an upright position while simultaneously providing a reservoir for liquid so as to keep the needles in a soft and life prolonging state.

There are commercially available a number of different Christmas tree stands. One of these comprises a cup-like base for receiving the bottom of the trunk of the tree. Pivoted to this cup-like base are three legs at equiangular positions. The lower ends of these legs rest on the floor so as to raise the cup off the floor. The upper ends of the legs have claws so as to bite into the trunk of the tree and thereby partially position the same.

A second type of a Christmas tree stand comprises a cup for receiving the base of the trunk of the tree. There are three legs attached to this cup. These legs are in equiangular position and raise the cup off the floor. Superimposed above the cup but attached to the same is a ring through which the trunk of the tree projects. Around the ring are three set-screws so as to position the trunk of the tree inside the ring.

In theory and by looking at these Christmas tree stands on display, the purchaser would assume that they would serve the purpose of holding a Christmas tree. However, they suffer a shortcoming of not maintaining the Christmas tree in an upright position. More particularly, there is only one position on the trunk of the tree that is firmly positioned by the Christmas tree stand. This is where the screws bear against the trunk of the tree or the claws bear against the trunk of the tree. As a result, the tree leans so as not to be in an upright position. In extreme cases a tree may lean so much as to topple over. To guard against the tree's leaning and toppling, it is necessary to brace the tree.

As a result of having tried to use such Christmas tree stands, I have invented a Christmas tree support which will maintain the Christmas tree in an upright position while also providing a reservoir of water so as to keep the needles moist.

The primary object of this invention is the provision of a Christmas tree support which holds the tree in an upright and vertical position and precludes the same from leaning or toppling.

A further object is to provide a support which can be adjusted to easily receive the Christmas tree and, therefore, be used by women and children.

A still further object is to provide such a support which has a large supporting area itself so as to prevent leaning and tipping of the Christmas tree.

Another object is to provide a Christmas tree support having a large base which acts as a reservoir or retainer for water.

An additional object is the provision of a support which is easily disassembled and when in the disassembled state occupies a small volume so that it can be readily stored until the next appropriate period.

Another object is the provision of such a support which can be inexpensively manufactured from commercially available parts.

These and further objects will be more completely brought forth upon reference to the following drawings, detailed specification of the invention and the attached claims.

In the drawings:

FIGURE 1 is a fragmentary perspective view of a specific embodiment of the invention, and illustrates the same holding a Christmas tree in an upright position with the trunk of the tree depicted in phantom.

FIGURE 2, on an enlarged scale, is an exploded view of the various components of the Christmas tree support.

FIGURE 3 illustrates an adjustable clamp for holding the trunk of the tree in an open position.

FIGURE 4 illustrates the adjustable clamp in a closed position around the trunk of a tree and which trunk is in phantom.

Figure 5:
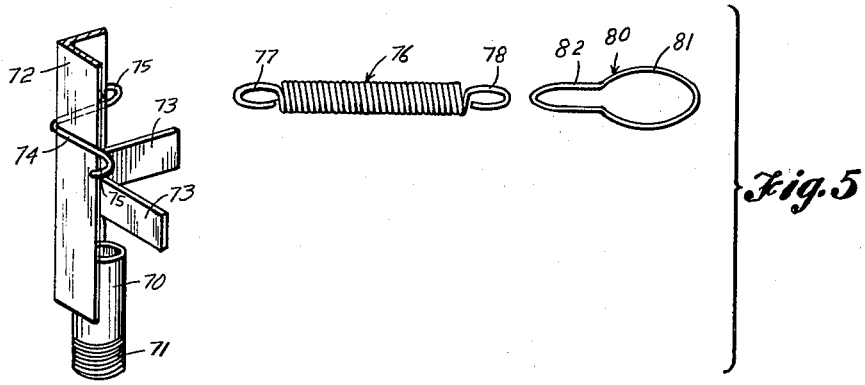
FIGURE 5 is an exploded view of the various components of another preferred embodiment of an adjustable clamp of the Christmas tree support.

Referring to the drawings, it is seen that the Christmas tree support comprises a pan 10 having a circular base 11 and a circumscribing upright side 12 so as, in effect, to form an open top receptacle. At approximately the center of the base there is a plate 13. This plate 13 may be welded to the base 11 on its upper surface. The central portion of the plate 13 is raised at 14 so as to be essentially a hub. In the central part of the hub 14, there is a drilled tapped hole 15.

There is also provided a standard 16 having a threaded lower end 17. The threaded lower end 17 cofits with the tapped hole 15 so as to allow the standard to be screwed therein in an upright vertical position.

In the standard 16 are two spaced-apart, lateral passageways 18 and 20. The passageway 18 is near the lower or threaded end 17 and the passageway 20 is near the upper or outer end of the standard 16. The purpose of each of these passageways is to receive a pin or screw for holding an adjustable clamp.

The adjustable clamp 21 comprises a base 22. In the central part of the base 22, there is a passageway 23. At each end of the base 22, projecting outwardly therefrom, are arms 24. As is seen in the drawing, these are spaced-apart arms 24. Each of the arms 24 projects outwardly into spaced-apart fingers 25. The arm 24 is recessed at 26 in the configuration of an arc, between the fingers 25, so as to receive or bear against the trunk of the supported Christmas tree.

At the extreme of each of the fingers 25, there is a hole 27.

In FIGURES 3 and 4 it is seen that in the upper hole 27 in the fingers 25, there is received a wire bracket 28. More particularly, this wire bracket comprises a base 30 which bends backwardly on itself into legs 31. The two legs 31 overlap and as they extend away from the base 30 they also expand away from themselves. Then the legs 31 bend back on themselves to a degree to form legs 32. The legs 32 then bend inwardly so as to fall back on base 30 and to form lugs or ears 33. The lugs or ears 33 cofit with respective holes 27 in the fingers 25.

Attached to the base 30 is a curved strap 34. The strap on its outer face has provision for a keeper 35. The keeper 35 fits around the base 30 so that the base 30 is between the keeper and the strap. In this manner the strap 34 is hinged on the base 30. The inner end of the strap 34 is in the configuration of a prong or finger 36. In viewing the drawings it is seen that the fingers 36 and the keeper 35 are close to each other on the strap 34.

Turning again to FIGURES 3 and 4 it is seen that the lower holes 27 receive a metal strap 37. This strap 37 has a curved flexible portion 38. The portion 38 is inwardly recessed or notched at 40. The inner end of the portion 38 expands into base portion 41 which in turn projects laterally into ears or lugs 42. In assembly the lugs 42 cofit with the holes 27, in FIGURES 3 and 4 these are the lower holes 27.

The adjustable clamp 21 is attached to the standard by means of screw 43 projecting through opening 23 in the base 22 of the clamp and also through the opening 18 in the standard. The wing nut 44 is screwed onto the threaded end of the screw 43 so as to cinch up or tighten the clamp onto the standard.

In operation, see FIGURES 1, 3 and 4, a Christmas tree 45 having a trunk is placed in the open clamp 21, see FIGURE 3. Then, the wire bracket 28, the leaf 34 and the leaf 37 can be moved so as to encircle the trunk 45 of the tree. The prong or finger 36 can be placed in appropriate recess 40 of the leaf 37 and rotated so as to firmly press the leaf 37, the wire bracket 28 and the leaf 34 against the trunk of the tree. In effect, it is seen that this provides a leverage so as to firmly lock the trunk of the tree in the clamp or clasp. The leaf 34 is rotated past dead center so as to lock the finger 36 in the appropriate recess 40. Furthermore, viewing FIGURE 3, it is seen that the inner surface of the leaf 37 is so recessed that there are inwardly projecting prongs 46. These prongs, in certain instances, function to bite into the trunk of the tree so as to lock it.

It is seen that the two clamps 21 on the standard 16 are spaced sufficiently far apart so that they, in effect, do not present a common pivot point to the Christmas tree. More particularly, they are so spaced that they can hold the Christmas tree in an upright position. Furthermore, the pan 10 is sufficiently large so that it will prevent tipping of the tree.

To assist in supporting the tree in an upright manner, there may be provided a number of lugs, i.e., three lugs spaced at equiangular positions around the circumference of the pan 10. These lugs 47 have holes 48 therein. As is appreciated, the lugs themselves rest against the floor or supporting area and help maintain the tree in an upright position. Also, the pan may be bolted to a supporting board or sheet of plywood by passing screws or bolts through the holes 48 in the lugs. In this manner, the supporting area is enlarged which lessens the possibility of the pan's tipping over.

Figure 6:
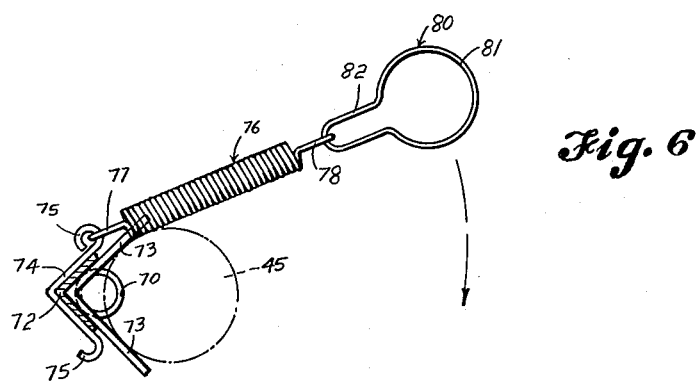
FIGURE 6 illustrates the adjustable clamp of FIGURE 5, in an open position, for holding the trunk of the tree; and, FIGURE 7 illustrates the adjustable clamp of FIGURE 5, in a closed position, around the trunk of the tree and which trunk is in phantom.
Figure 7:
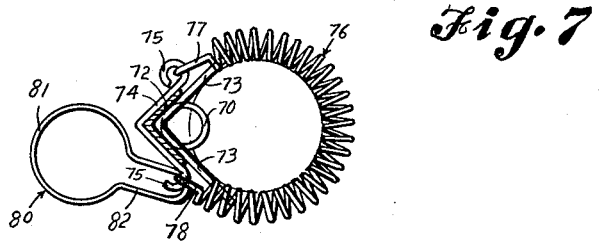

FIGURES 5, 6 and 7 illustrate another support and adjustable clamp. The support comprises a pipe 70 having a lower threaded end 71. Attached to the upper part of the pipe 70 is an angle 72. Attached to the angle 72 are two adjustable spaced-apart clamps. In FIGURE 5 there is illustrated only one adjustable clamp, in an exploded view, but it is to be realized that in actual practice there are two spaced-apart clamps. Each clamp comprises two fingers 73. These fingers 73 are welded to the inside of the angle 72 and to the fingers of the angle 72 and project outwardly therefrom. Welded to the back of the angle 72 and spaced slightly away from the fingers 73 is a clamping wire 74. The clamping wire on each end bends into a hook 75.

The adjustable part of the clamp comprises a spring 76 having a wire hook 77 on one end and a wire hook 78 on the other end. It is to be realized that the hooks 77 and 78 do not form closed circular loops but are open loops or hooks.

Associated with the spring 76 is a looped attachment 80 having a relatively large loop 81 and a long angular smaller loop 82. The loop 81 and the loop 82 are of the same singular integral loop 80.

In use a Christmas tree having a trunk 45 is placed against the angle 72 and also the fingers 73. The hook 77 of the spring 76 is attached to one of the hooks 75 and by means of the attachment 80 in the hook 78 the spring 76 is stretched around the trunk of the tree 45 so as to catch the hooks 78 in the hook 75 of the wire attachment 74 on the angle 72. In this manner, the spring 76 is stretched so as to firmly grip the trunk 45 of the Christmas tree.

It is seen by means of spring 76 in FIGURES 5, 6 and 7 that Christmas trees having trunks of varying diameters may be held in place relatively easily. Also, by means of these adjustment clamps it is possible to manufacture Christmas tree supports relatively inexpensively.

I have found that a desirable size for this Christmas tree support is as follows. The pan 10 can have a diameter of 16 or 17 inches; a height of three or four inches; the standard 16 or 70 and 72 a height of 10 to 12 inches with clamps 21, 50 and 76 spaced 6 to 8 inches apart. With this spacing of the clamps, there are two independent points for supporting the tree, therefore, the tree will not topple or fall over. The plate 13, on the upper surface of the base 11 may have a diameter of 3 inches and the standard may be a pipe of one-half inch diameter or three-quarter inch diameter or it may be a solid rod threaded at its lower end or it may be a pipe having an angle iron extension.

From this it is seen that the Christmas tree support can be manufactured from readily available parts with the minimum of machining and workmanship.

It is to be realized that there are many variations in this Christmas tree support such as the clamp can be welded to the standard 16 or 70 and 72 instead of being attached by means of a screw. Another variation is that in certain instances the base 11 may be of sufficient thickness that there is no need for a plate 13 but that the base 11 may be tapped to receive a threaded lower end of a standard 16.

From the above description, it is seen that the pan 10 can be filled with water, rocks or sand, or a combination of rocks, water and sand so as to provide moisture and added weight to the base of the tree.

Having presented my invention, what I claim is:

1. A Christmas tree support, said support comprising in combination a pan having a base and an upright circumscribing side, said base and circumscribing side defining an open top receptacle, a tapped passageway in said base, a standard, said standard being threaded on its lower end for cofitting with said tapped passageway, two clamps integral with said standard, said two clamps being in a spaced-apart relationship on the standard and spaced sufficiently far apart so as to preclude the two clamps being the eqivalent of a common pivot for the trunk of the Christmas tree, said two clamps adapted to hold the trunk of the Christmas tree, each said clamps comprising two outwardly directed fingers on the standard, a wire bracket attached to the standard and terminating on each end in a hook-like bend, a cylindrical coil spring having a hook on one end for attaching to one of the hooks on the wire bracket, the other end of the cylindrical coil spring having means for stretching the spring, said wire bracket on the standard being positioned closely to the outwardly directed fingers, said cylindrical coil spring on the end with the means for stretching the spring terminating in a hook, and said clamps in holding position for the trunk of the tree having the trunk bearing against the outwardly directed fingers with one end of the cylindrical coil spring attached to one hook-like bend and cylindrical coil spring stretched around the trunk of the tree with the other end of the spring attached to the other hook-like bend thereby having the trunk of the tree held by the two outwardly directed fingers and the stretched cylindrical coil.

2. A tree support, said support having a base, a standard, means to attach the standard to the base, two clamps integral with said standard, said two clamps being in a spaced-apart relationship on the standard and spaced sufficiently far apart so as to preclude the two clamps being the equivalent of a common pivot for the trunk of the tree, said two clamps adapted to hold the trunk of the tree, said clamps each comprising two outwardly directed fingers on the standard, a wire bracket attached to the standard and terminating on each end in a hook-like bend, a cylindrical coil spring having a hook on one end for attaching to one of the bends on the wire bracket, the other end of the cylindrical coil spring having means for stretching the spring, said cylindrical coil spring on the end with the means for stretching the spring terminating in a hook, and said clamps in position for the trunk of the tree having the trunk bearing against the outwardly directed fingers with one end of the cylindrical coil spring attached to the wire hook-like bend and the cylindrical coil spring stretched around the trunk of the tree with the other end of the spring attached to the other hook-like bend thereby having the trunk of the tree held by the two outwardly directed fingers and the stretched cylindrical coil.

References Cited in the file of this patent

UNITED STATES PATENTS

| | | | |
|---|---|---|---|
| 1,552,535 | Beerstecher | Sept. 8, | 1925 |
| 1,648,338 | Gaines | Nov. 8, | 1927 |
| 1,761,497 | Smith | June 3, | 1930 |
| 2,500,215 | Swearingen | Mar. 14, | 1950 |
| 2,511,292 | Myers | June 13, | 1950 |
| 2,617,617 | Krastel | Nov. 11, | 1952 |
| 2,625,356 | Kennedy | Jan. 13, | 1953 |
| 2,740,219 | Harden | Apr. 3, | 1956 |
| 2,904,292 | Clouthier | Sept. 15, | 1959 |

FOREIGN PATENTS

| | | | |
|---|---|---|---|
| 532,940 | Canada | Nov. 13, | 1956 |